Feb. 14, 1933.  W. F. STIMPSON  1,897,446
WEIGHING SCALE
Filed July 6, 1931   2 Sheets-Sheet 1

INVENTOR
Walter F. Stimpson
BY Swan & Frye
ATTORNEYS

Feb. 14, 1933.  W. F. STIMPSON  1,897,446
WEIGHING SCALE
Filed July 6, 1931  2 Sheets-Sheet 2

INVENTOR
Walter F. Stimpson
BY
Swan & Frye
ATTORNEYS

Patented Feb. 14, 1933

1,897,446

UNITED STATES PATENT OFFICE

WALTER F. STIMPSON, OF DETROIT, MICHIGAN

WEIGHING SCALE

Application filed July 6, 1931. Serial No. 548,773.

This invention relates to weighing scales of the cylinder type, and more particularly to a novel and improved form of end-indicating means for incorporation in the construction thereof. An object of the invention is the provision of means whereby an observer may read the weight being registered by the scale when facing it from any angle, as well from the ends or sides as from the front and back.

Cylinder scales are commonly of the computing type, and comprise a weighing platform and an upstanding support at the rear thereof, transversely of the top of which a cylindrical chart is rotatably journaled in a housing. The housing may be and usually is also cylindrical, and is ordinarily provided with observation windows for viewing the chart, as well as pointers and other indicia for cooperation therewith. In such scale constructions it is important that the chart be as light in weight as is practicable, in order that its inertia may cause the minimum amount of interference with the sensitivity and quickness of responses of the scale. An important object of this invention, therefore, is the provision of such a scale in which not only may the weight being registered by the scale at any time be read when looking at either end of the cylinder housing, and in which the end-indicating means comprises a chart moving past a fixed pointer or other line, but one also in which such end-indicating means adds very little to the weight of the cylindrical chart, and thus effects to an absolute minimum the sensitivity of the scale.

Other objects and advantages will be apparent from the following description wherein reference is made to the accompanying drawings illustrating a preferred embodiment of my invention and wherein similar reference numerals designate similar parts throughout the several views.

Figure 3:
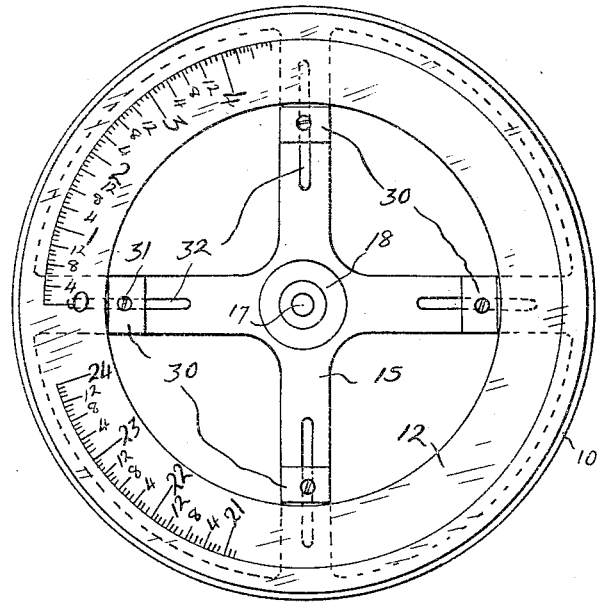
Figure 4:
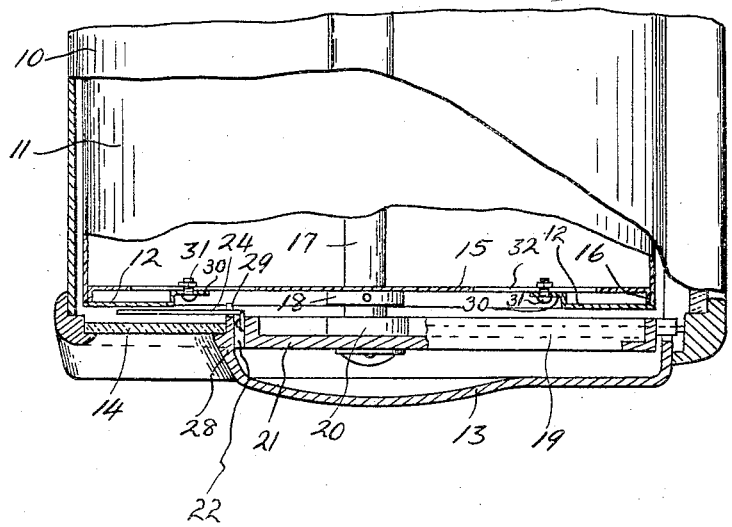

Figure 3 is an end view partly in elevation and partly in section, looking in a similar direction but with the supporting framework in which one end of the cylinder is journaled as well as the cover plate removed, and Figure 4 is a view partly in top plan and partly in horizontal section of the cylinder portion of the scale, the sectional portion of the view being taken substantially on a horizontal plane extending through the axis of the cylinder.

Referring now to the drawings: Reference character 10 indicates the cylinder housing, which may be of sheet metal and of the usual or any desired construction. The cylindrical chart 11 is rotatably journaled in the housing 10, being usually provided with price-graduations, designed to cooperate with "price-per-pound" graduations fixedly carried by the housing adjacent a hairline extending across a window therein and observable by the merchant from the platform side of the scale. Scales of this type are usually also provided with graduations, reading only in weight-indication, which are viewable through a smaller window upon the opposite side of the housing from the platform, being primarily intended for the use of the customer.

In modern arrangements of store equipment, however, it is often desired to so place the scale that customers normally face the end of the cylinder housing. To provide weight graduations readable by them from such position I propose to secure an annular dial 12 to the end of the cylindrical chart, and form an aperture in the end plate 13, closed by a window 14 through which the scale 12 is readable.

The regular cylindrical chart is supported at each end by a spider 15, which carries an annular peripheral flange 16 to which the chart may be secured by any suitable but preferably very light fastening means; as by relatively fine wire extending through aligned apertures in each. The spider is rigidly secured to the shaft 17, as by means of the collar 18 which is pinned to the shaft and to which the spider is rigidly attached. The spider 15, chart 11, and other members associated therewith are of course of as light construction as is practicable.

Figure 2:
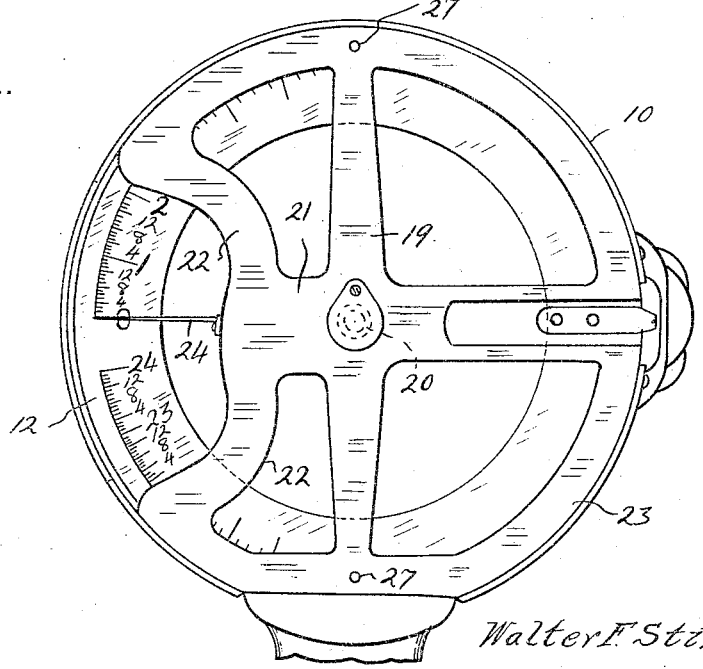
Figure 2 is a similar end elevational view, but with the cover plate removed.

A heavier fixed supporting spider 19 is carried by the housing 10 outside and adjacent the spider 15, and the shaft 17 projects far enough from the spider 15 to be journaled in the ball bearing 20 carried by and positioned approximately in the center of the former. As shown in Figure 2 I preferably form one arm, as 21, of the spider 19, with spaced laterally extending branches 22, and also cut away the otherwise continuous peripheral portion 23 thereof between the branching arms 22. A pointer 24 is secured to the spider 19 extending radially between the branches 22 as shown in Figures 2 and 4.

Figure 1:
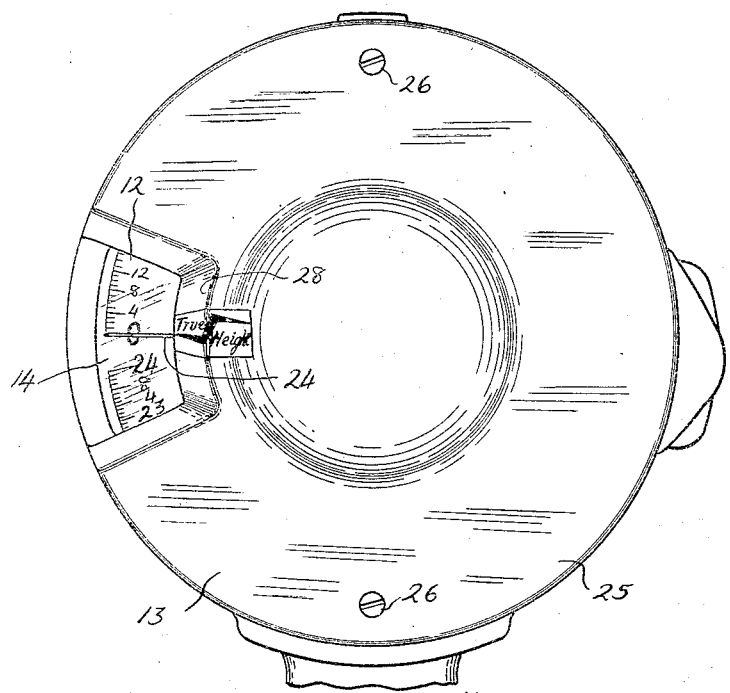
Figure 1 is an end elevational view of the cylindrical upper chart-housing portion of a cylinder scale embodying my invention, the supporting column being also fragmentarily shown.

The cover plate 13 may be secured to the end of the housing to protect and finish the same, and may be fastened to the spider 19, as by screws 26 engaging suitably tapped apertures 27 in the spider. The cover plate may of course be enameled, plated or provided with any other desired finish, and is formed with an aperture therein in alignment with the space between the branches 22 of the spider 19, which aperture is also so arranged that the pointer 24 projects substantially across the middle thereof. As shown in Figures 1 and 4 the aperture in the cover plate is formed with inturned beveled edges 28, which extend inwardly a considerable distance, and a sheet of glass or lens 14 is secured to the inside thereof covering the aperture. As shown in Figure 4, the inturned portions 28 of the cover plate 13 actually project into the space between the branches 22 of the spider 19, and the glass 14 is in this manner brought relatively close to the scale 12, thus making it much more easily readable than it would otherwise be, both by reason of this positioning, and also because of the much greater and better illumination of the dial from outside light which is thereby obtained. The inturned edge 28 may be notched or cut away, as at 29, to permit the pointer 24 carried by the spider 19 to extend therethrough, and across and between the chart 12 and window 14.

The chart 12 may be formed of cardboard, celluloid, or other suitable translucent material, and the graduations printed or engraved thereon in a contrasting color, so that if it is desired to provide artificial illumination inside the cylindrical housing and chart, the rays may shine through the chart 12 and provide indirect illumination thereof.

I preferably secure the chart 12 to the spider 15 by providing the chart with integral inset tabs 30 aligned with the branches of the spider, and fastened thereto by means of relatively small nuts and bolts, as 31, passing through apertures in the tabs 30 and slots 32 in the arms of the spider, which slots are normally present in the spider in any event.

It will thus be seen that I have provided a fixed pointer and moving scale end-indicator mechanism incorporatable in a cylinder scale of otherwise conventional construction, in which no appreciable weight is added to the regular rotatable chart and support members ordinarily incorporated in scales of this type, and in which also, despite the necessary supporting framework for the cylindrical chart, the observation window for the end-indicator is placed so close to the end scale that adequate illumination of the latter is provided without interior illumination if a reasonable amount of outside light is present.

If a scale provided with one or more of my improved end indicators also has the usual window and weight indicating scale on the rear side of the cylinder opposite the platform, the weight of an object may be read from any angle of view, as the closeness of the end dials to their windows, above remarked upon also makes them readable through wide angles, and easily visible before the observer reaches the point from which the rear indicator is no longer in view.

While it will be apparent that the illustrated embodiment of my invention herein disclosed is adequately calculated to fulfill the objects and advantages primarily stated, it is to be understood that the invention is susceptible to variation, modification and change within the spirit and scope of the subjoined claims.

What I claim is:

1. In combination with a weighing scale having a substantially cylindrical rotatable indicating chart, a fixed supporting spider at each end of the cylindrical chart in which the latter is journaled on a substantially horizontal axis, a housing enclosing such chart and supports having an aperture in its end, inturned edges carried by the cover surrounding the aperture and projecting inwardly through a portion of one of the spiders, additional indicating means comprising a substantially annular dial provided with weight-indicating graduations so secured to the end of the cylindrical chart as to be readable through the aperture in the housing, the inturned edges of the aperture terminating relatively close to the dial, and a fixed indicator for cooperation with the dial.

2. In combination with a weighing scale having a substantially cylindrical indicating chart rotatably journaled on a horizontal axis, and a housing enclosing such chart having an aperture in its end, additional indicating means comprising a relatively flat annular dial provided with weight-indicating graduations and secured to the end of the cylindrical chart in such manner as to be readable through the aperture in the housing, an inturned portion carried by the end portion of the housing abutting the aperture therethrough, a transparent member secured across the inturned edges in relatively close proximity to the dial, and a fixed indicator for cooperation with the dial.

3. In combination with a weighing scale having a substantially cylindrical indicating chart rotatably journaled on a horizontal axis, an apertured fixed support at each end of the chart and a housing enclosing the chart and support having an aperture in its end arranged in front of an aperture in the chart support and inturned edges surrounding such aperture and projecting inwardly therefrom and through the aperture in the chart support, additional indicating means comprising a substantially annular dial provided with weight-indicating graduations secured to the end of the cylindrical chart in such manner as to be readable through the aperture in the housing, a transparent member secured across the inturned edges of the aperture in relatively close proximity to the dial, and a fixed indicator for cooperation with the scale carried by the dial and projecting across the aperture.

4. In a weighing scale, load receiving means, a substantially cylindrical rotatable indicating chart connected thereto, an apertured supporting member arranged at the end of the chart, a casing substantially enclosing the cylindrical chart and supporting member but apertured at its end in substantial alignment with the aperture in the support, another chart mounted at the end of the cylindrical chart and rotatable therewith, and visible through the aperture, and means cooperating with the aligned apertures extending through the supporting member and terminating in relatively close proximity to the dial, for preventing observation of the interior of the casing.

5. In a weighing scale, in combination with load counterbalancing mechanism, indicating mechanism including a substantially cylindrical chart, a substantially annular dial having a maximum diameter approximating that of the cylindrical chart, rotatable with and mounted at an end thereof, a cover member of substantial thickness covering the dial but peripherally apertured for observation thereof in such manner that the edge of the cover member may be cut away to reduce its thickness adjacent the aperture.

In testimony whereof I sign this specification.

WALTER F. STIMPSON.